(12) United States Patent
Kobayashi

(10) Patent No.: US 8,306,700 B2
(45) Date of Patent: Nov. 6, 2012

(54) VEHICLE TRAVEL SUPPORT DEVICE, VEHICLE, AND VEHICLE TRAVEL SUPPORT PROGRAM

(75) Inventor: Sachio Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 202 days.

(21) Appl. No.: 12/867,605

(22) PCT Filed: Jan. 9, 2009

(86) PCT No.: PCT/JP2009/000073
§ 371 (c)(1),
(2), (4) Date: Aug. 13, 2010

(87) PCT Pub. No.: WO2009/113224
PCT Pub. Date: Sep. 17, 2009

(65) Prior Publication Data
US 2010/0332050 A1    Dec. 30, 2010

(30) Foreign Application Priority Data
Mar. 12, 2008  (JP) ................................ 2008-062278

(51) Int. Cl.
*A01B 69/00*        (2006.01)
(52) U.S. Cl. ................ 701/41; 701/28; 701/36; 701/48; 701/70; 701/96; 701/117; 701/301; 382/103; 382/104; 382/106
(58) Field of Classification Search .............. 701/36, 701/41, 28, 48, 70, 301, 96; 340/436; 382/104, 382/106, 103
See application file for complete search history.

(56) References Cited

U.S. PATENT DOCUMENTS
6,973,380 B2    12/2005    Tange et al.
(Continued)

FOREIGN PATENT DOCUMENTS
EP       1 603 097 A2    12/2005
(Continued)

OTHER PUBLICATIONS

Jochem et al., "Vision Based Intersection Navigation," Intelligent Vehicles Symposium, Proceedings of the 1996 IEEE Tokyo, Japan, pp. 391-396, XP 010209769, Sep. 19, 1996.

*Primary Examiner* — Redhwan K Mawari
(74) *Attorney, Agent, or Firm* — Carrier Blackman & Associates, P.C.; Joseph P. Carrier; William D. Blackman

(57) ABSTRACT

A vehicle travel support device capable of continuing operation even when the recognition accuracy of a lane mark has been degraded, and the like, wherein the degree of control on the operation of a steering device or the like is set higher as the reliability of a lane mark becomes higher. In a state in which the reliability of a travel area demarcated by the lane mark is high, a vehicle's travel is relatively strongly or actively supported so that the vehicle will not depart from the travel area. On the other hand, the degree of control on the operation of the steering device or the like is set lower as the reliability of the lane mark is lower. In a state in which the reliability of the travel area demarcated by the lane mark is low, the vehicle's travel is relatively weakly or passively supported so that the vehicle will not depart from the travel area.

7 Claims, 6 Drawing Sheets

U.S. PATENT DOCUMENTS

| | | |
|---|---|---|
| 7,265,657 B2 | 9/2007 | Nishida et al. |
| 2004/0183663 A1 | 9/2004 | Shimakage |
| 2006/0233425 A1* | 10/2006 | Kobayashi et al. ........... 382/106 |
| 2006/0239509 A1 | 10/2006 | Saito |
| 2007/0203617 A1* | 8/2007 | Haug ................. 701/1 |
| 2009/0024278 A1 | 1/2009 | Kondo et al. |
| 2009/0118994 A1 | 5/2009 | Mori et al. |
| 2009/0271071 A1 | 10/2009 | Buerkel et al. |

FOREIGN PATENT DOCUMENTS

| | | |
|---|---|---|
| JP | 10-261065 A | 9/1998 |
| JP | 11-232467 A | 8/1999 |
| JP | 2000-105898 A | 4/2000 |
| JP | 2000-207692 A | 7/2000 |
| JP | 2001-023094 A | 1/2001 |
| JP | 2001-344687 A | 12/2001 |
| JP | 2002-002427 A | 1/2002 |
| JP | 2003-252149 A | 9/2003 |
| JP | 2003-327012 A | 11/2003 |
| JP | 2004-178159 A | 6/2004 |
| JP | 2005-165708 A | 6/2005 |
| JP | 2005-178743 A | 7/2005 |
| JP | 2006-264405 A | 10/2006 |
| JP | 2007-004669 A | 1/2007 |
| JP | 2007-099124 A | 4/2007 |
| JP | 2007-164636 A | 6/2007 |
| WO | 2008/043591 A1 | 4/2008 |

* cited by examiner

# VEHICLE TRAVEL SUPPORT DEVICE, VEHICLE, AND VEHICLE TRAVEL SUPPORT PROGRAM

CROSS-REFERENCE TO RELATED APPLICATIONS

The present invention is the US National Phase of International Application No. PCT/JP2009/000073 filed 9 Jan. 2009, which claims priority under 35 USC 119 based on Japanese patent application No. 2008-062278 filed on 12 Mar. 2008. The entire subject matter of these priority documents is incorporated by reference herein.

BACKGROUND OF THE INVENTION

1. Field of the Invention

The present invention relates to a device supporting a vehicle in travelling according to an image obtained through an imaging device mounted in the vehicle, and the like.

2. Description of the Related Art

There has been disclosed an art (refer to Japanese Patent Laid-open No. 2001-023094) in which a disposition of a lane mark such as a traffic lane or a raised road marker provided on a road where a vehicle is travelling according to an image photographed by a camera mounted in the vehicle is recognized. There has also been disclosed an art which controls an operation of a steering device or the like to prevent the vehicle from departing from a travel area sandwiched by lane marks of which dispositions have been recognized at a left side and a right side of the vehicle in the travelling direction, respectively (refer to Japanese Patent Laid-open No. 2006-264405).

However, due to the disturbance from rain, deposited snow, backlight of the sun or the like, a recognition accuracy of the lane mark will be degraded; thereby, it may become necessary to stop the operation of the vehicle travel support device.

SUMMARY OF THE INVENTION

The present invention has been accomplished in view of the aforementioned problems, and it is therefore an object of the present invention to provide a vehicle travel support device capable of operating continuously even when a recognition accuracy of the lane mark is degraded.

A first aspect of the present invention provides a vehicle travel support device which comprises a first processing element configured to recognize a disposition of a lane mark on a road where a vehicle is traveling according to an image of the road obtained through an imaging device mounted on the vehicle and recognize a travel area demarcated by the lane mark; and a second processing element configured to control an operation of either one or both of a steering device and a braking device mounted in the vehicle to prevent the vehicle from departing from the travel area recognized by the first processing element, wherein the first processing element evaluates a reliability of the lane mark, and the second processing element sets a degree of control on the operation of either one or both of the steering device and the braking device higher stepwise or continuously as the reliability of the lane mark evaluated by the first processing element becomes higher.

According to the vehicle travel support device of the first aspect of the present invention, the higher the reliability of the lane mark is, the higher the degree of control on the operation of either one or both (referred to as the steering device and the like where appropriate) of the steering device and the braking device is set. Thereby, when the reliability of the travel area demarcated by the lane mark is high, the travel of the vehicle is relatively strongly or actively supported to prevent the vehicle from departing from the travel area. On the other hand, the lower the reliability of the lane mark is, the lower the degree of control on the operation of either one or both of the steering device and the braking device is set. Thereby, when the recognition accuracy or the reliability of the travel area demarcated by the lane mark is low, the travel of the vehicle is relatively weakly or passively supported to prevent the vehicle from departing from the travel area. In other words, when the reliability of the lane mark and the reliability of the travel area are low, the operation of the vehicle travel support device is prevented from being stopped. Even when the reliability of the lane mark and the reliability of the travel area are low, the travel of the vehicle is supported relatively weakly without interruption. Accordingly, the operations of the steering device and the like can be controlled appropriately to prevent the vehicle from departing from the travel area from the viewpoint of supporting the travel of the vehicle.

It should be noted that in the present invention a component "recognizes" information" means that the component performs a possible information process on a piece of information to prepare the piece of information ready for other information process, for example, the component searches the piece of information in a database or retrieves the piece of information from a storing unit such as a memory; measures, calculates, estimates, determines the piece of information according to an output signal from a sensor or the like; and stores in memory or the like the determined information or the like.

A second aspect of the present invention is dependent on the vehicle travel support device of the first aspect of the present invention, wherein the first processing element evaluates either one or both functions of a recognizable distance of the lane mark from the vehicle and a density of the lane mark as the reliability of the lane mark.

According to the vehicle travel support device of the second aspect of the present invention, when a lane mark is recognized relatively far away from the vehicle or the density of the recognized lane mark is relatively high, the reliability of the lane mark is evaluated higher. On the other hand, when a lane mark can only be recognized relatively close to the vehicle or the density of the recognized lane mark is relatively low, the reliability of the lane mark is evaluated lower. Thereby, by setting the degree of control on the operations of the steering device and the like according to the different reliability of the lane mark, the operations of the steering device and the like can be controlled appropriately to prevent the vehicle from departing from the travel area from the viewpoint of supporting the travel of the vehicle.

A third aspect of the present invention is dependent on the vehicle travel support device of the first aspect or the second aspect of the present invention, wherein the second processing element sets either one or both functions of a gain coefficient and the number of controlled variables as the degree of control on either one or both of the steering device and the braking device according to the reliability of the lane mark evaluated by the first processing element.

According to the vehicle travel support device of the third aspect of the present invention, either one or both of the gain coefficient and the number of controlled variables are adjusted according to the reliability of the lane mark and the reliability of the travel area demarcated by the lane mark. Thereby, when the reliability of the travel area demarcated by the lane mark is high, the travel of the vehicle is relatively strongly or actively supported to prevent the vehicle from departing from the travel area. On the other hand, when the reliability of the travel area demarcated by the lane mark is low, the travel of the vehicle is relatively weakly or passively supported to prevent the vehicle from departing from the travel area. Accordingly, the operations of the steering device and the like can be controlled appropriately to prevent the vehicle from departing from the travel area from the viewpoint of supporting the travel of the vehicle.

A fourth aspect of the present invention is a vehicle provided with an imaging device, a steering device, a braking device and the vehicle travel support device of the first aspect of the present invention.

According to the vehicle of the fourth aspect of the present invention, the operations of either one or both of the steering device and the braking device can be controlled appropriately by the vehicle travel support device to prevent the vehicle from departing from the travel area from the viewpoint of supporting the travel of the vehicle.

A fifth aspect of the present invention is a vehicle travel support program causing a vehicular computer to function as the vehicle travel support device of the first aspect of the present invention.

According to the vehicle travel support program of the fifth aspect of the present invention, the vehicular computer is caused to function as the vehicle travel support device which controls the operations of either one or both of the steering device and the braking device appropriately to prevent the vehicle from departing from the travel area from the viewpoint of supporting the travel of the vehicle.

DETAILED DESCRIPTION OF THE PREFERRED EMBODIMENTS

An embodiment of a vehicle travel support device and the like according to the present invention will be described with reference to the drawings.

Figure 1:
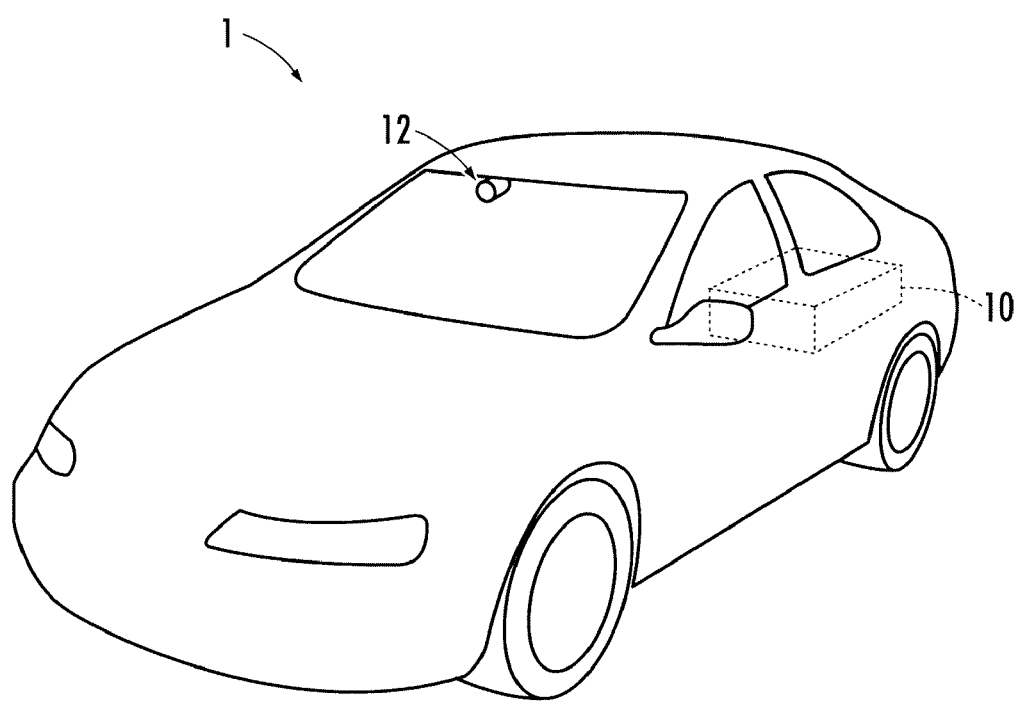
FIG. 1 is an explanatory diagram illustrating a vehicle of the present invention.
Figure 2:
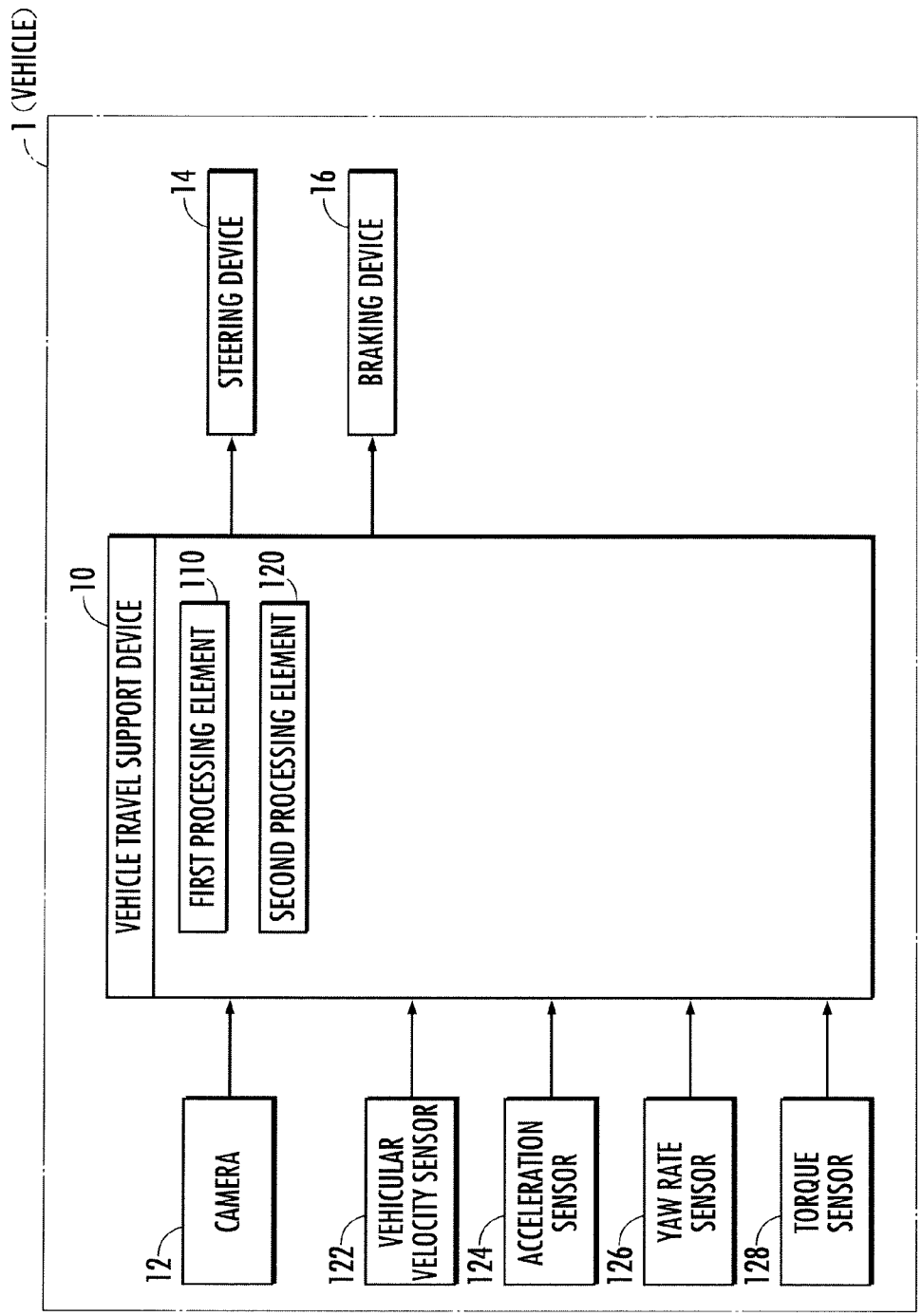
FIG. 2 is an explanatory diagram illustrating a vehicle travel support device of the present invention.

A vehicle (four-wheeled automobile) illustrated in FIG. 1 and FIG. 2 is mounted with a camera (imaging device) 12 such as a CCD camera, a CMOS image sensor or a near infrared camera, and a vehicle travel support device 10. The camera 12 is fixed in the vehicular compartment to photograph the front side of the vehicle 1 through the windshield. The vehicle 1, as illustrated in FIG. 2, is further disposed with sensors such as a vehicular velocity sensor 122, an acceleration sensor 124, a yaw rate sensor 126 and a torque sensor 128, a steering device 14 and a braking device 16. The vehicular velocity sensor 122, the acceleration sensor 124 and the yaw rate sensor 126 output signals related to a vehicular velocity, an acceleration and a yaw rate of the vehicle 1, respectively. As disclosed in Japanese Patent Laid-open No. 2003-154960, the torque sensor 128, according to an operation on a steering wheel by a driver, outputs a signal corresponded to a steering torque generated in a pinion connected to the steering wheel via a steering shaft or the like. The steering device 14 is configured to drive a front-wheel steering mechanism via the actuator according to the operation of the steering wheel. It is acceptable that a rear-wheel steering mechanism is driven by the steering device 14 in place of or in addition to the front-wheel steering mechanism.

The vehicle travel support device 10 is composed of a computer or an ECU (Electrical Control Unit composed of a CPU, a ROM, a RAM and electrical circuits such as an I/O circuit and an A/D conversion circuit and the like). Output signals from the camera 12, the velocity sensor 122 and the like are input into the vehicle travel support device 10. A vehicle travel support program is retrieved from memory by CPU, and various processes to be described hereinafter are performed according to the retrieved program. The program may be distributed or broadcasted from a server to the vehicle 1 through a network or a satellite at an arbitrary time and stored in the RAM or the like of the computer mounted in the vehicle. The vehicle travel support device 10 performs a travel support control which supports the vehicle 1 to travel without departing from a travel area by controlling operations of either one or both of the steering device 14 and the braking device 16.

The vehicle travel support device 10 is provided with a first processing element 110 and a second processing element 120.

The first processing element 110 recognizes a disposition of a lane mark on a road where the vehicle 1 is traveling according to an image of the road obtained through the camera 12 and a travel area demarcated by the lane mark. The first processing element 110 evaluates a reliability of the lane mark.

The second processing element 120 controls an operation of either one or both of the steering device 14 and the braking device 16 to prevent the vehicle 1 from departing from the travel area recognized by the first processing element 110. The second processing element 120 sets a degree of control on the operation of either one or both of the steering device 14 and the braking device 16 higher stepwise or continuously as the reliability of the lane mark evaluated by the first processing element 110 becomes higher.

Functions of the vehicle 1 and the vehicle travel support device 10 with the aforementioned configurations will be described hereinafter.

Figure 3:
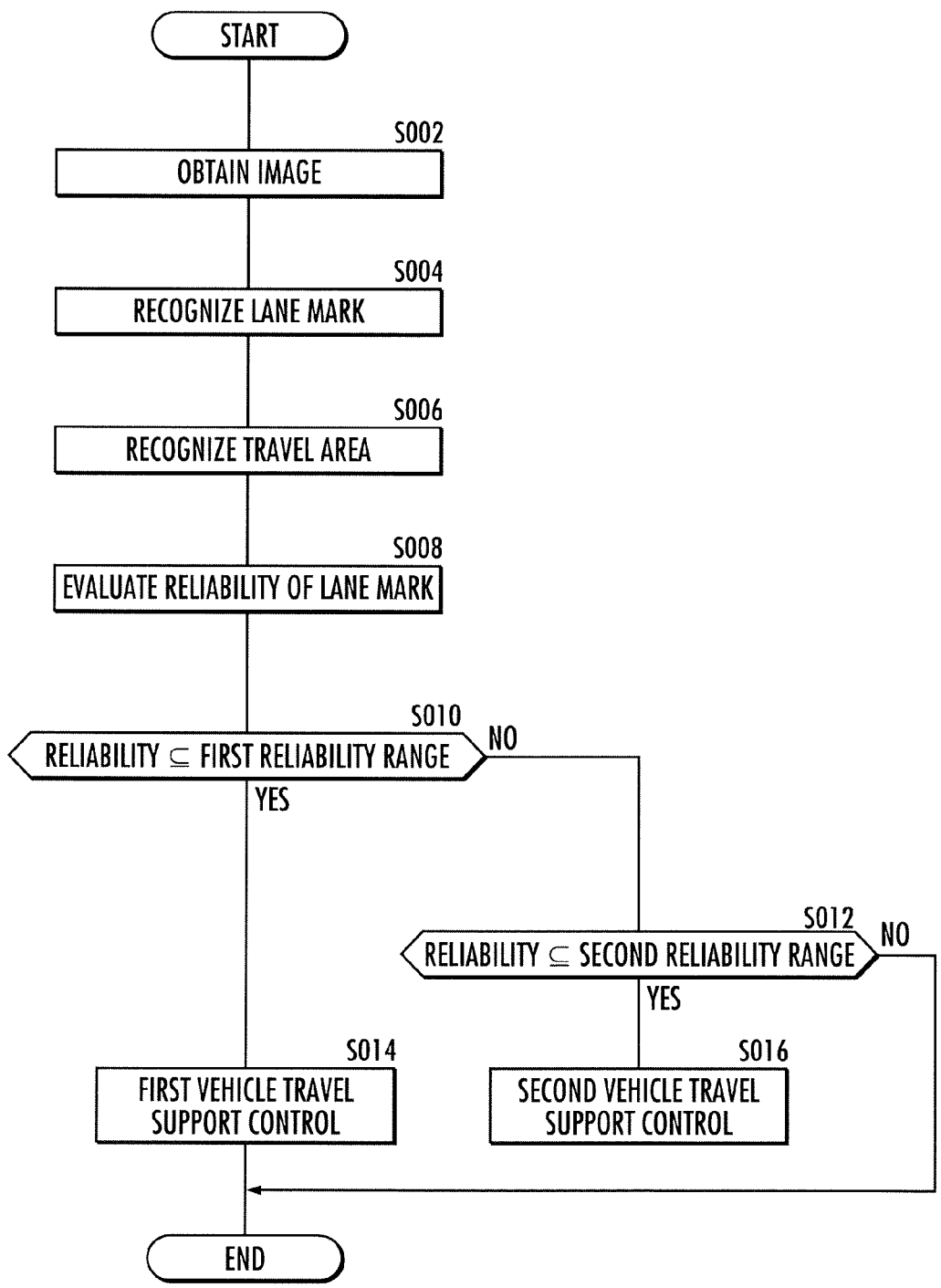
FIG. 3 is a flow chart illustrating functions of the vehicle travel support device of the present invention.
Figure 4:
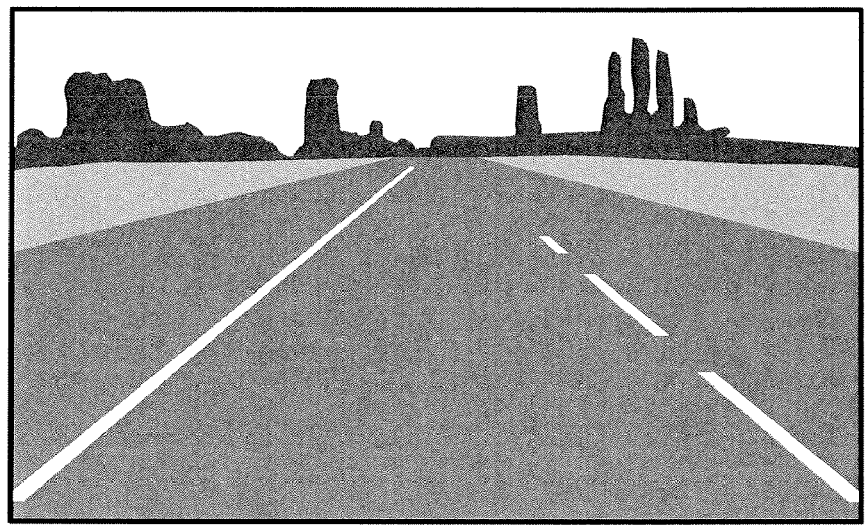
FIG. 4 is an explanatory diagram related to a recognition result of a lane mark (example 1).
Figure 4:
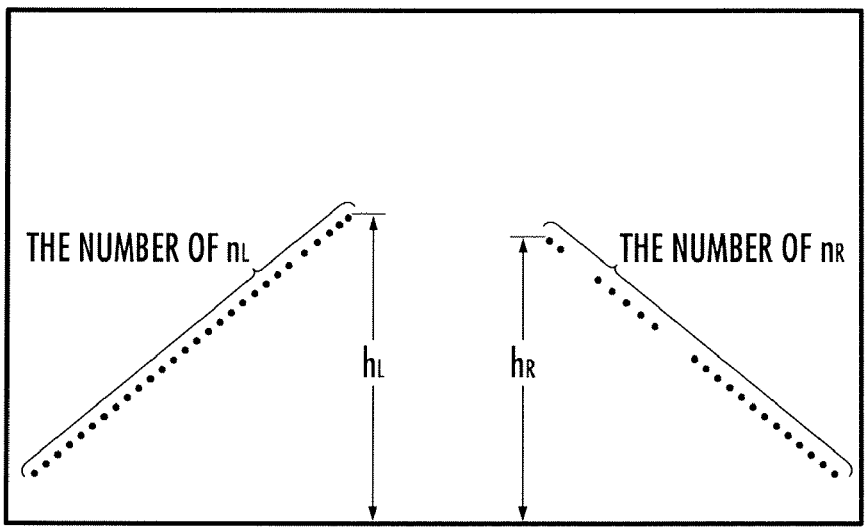
Figure 5:
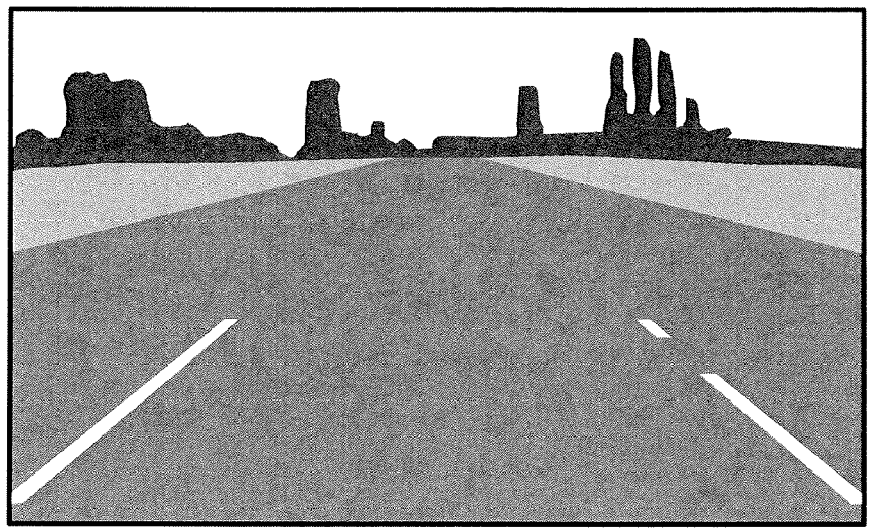
FIG. 5 is an explanatory diagram related to a recognition result of a lane mark (example 2).
Figure 5:
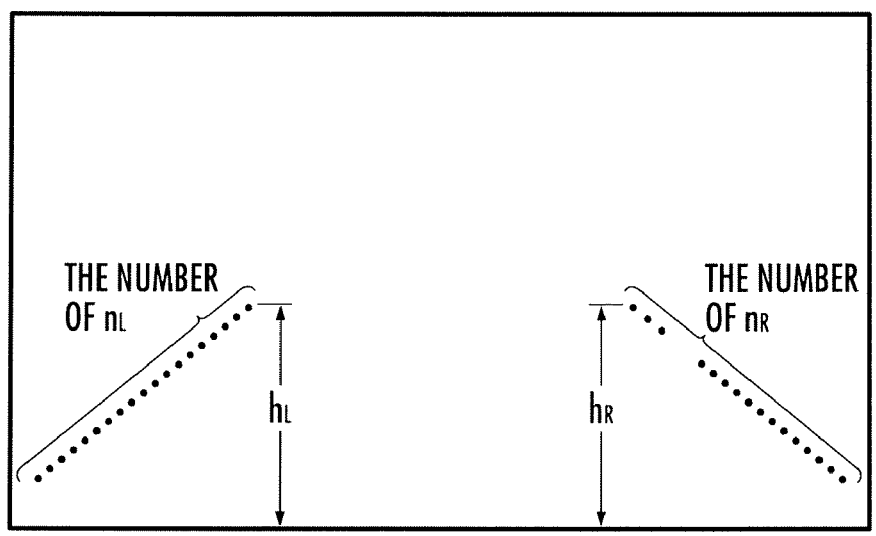

First, an image denoting a situation in front of or in the traveling direction of the vehicle 1 is obtained through the camera 12 (FIG. 3/S002). For example, as illustrated in FIG. 4($a$) or FIG. 5($a$), an image (digital image) of the road extending in front of the vehicle 1 is obtained. FIG. 4($a$) illustrates a situation where a lane mark disposed on a road without disturbance can be recognized far away from the vehicle 1. FIG. 5($a$) illustrates a situation where a lane mark disposed on a road with disturbance from rain, deposited snow, backlight of the sun or the like can only be recognized close to the vehicle 1.

Thereafter, the disposition of the lane mark in a vehicular coordinate system (a fixed coordinate system with respect to the vehicle 1) or a real spatial coordinate system is recognized by the first processing element 110 on the basis of the obtained image (FIG. 3/S004). According thereto, in the image illustrated in FIG. 4($b$) or FIG. 5($b$), the positions of the edges or edge points (black dots) of a lane mark are recognized, and the positions of the edge points are recognized in the vehicular coordinate system via coordinate conversion from the image coordinate system to the vehicular coordinate system. In an example illustrated in FIG. 6, the front side and the left side to the vehicle 1 are defined as +x direction and +y direction, respectively, in the vehicular coordinate system. A lane mark such as Botts dots or a traffic line (white line) may be recognized according to an image processing method disclosed in Japanese Patent Laid-Open No. 2006-269605, 2006-309499 or 2006-331193. Subsequently, the travel area demarcated by the lane marks from both sides thereof is recognized by the first processing element 110 (FIG. 3/S006). It should be noted that if a lane mark is failed to be recognized, the recognition of the travel area and a vehicle travel support control to be described hereinafter are omitted.

Next, a reliability of the lane mark is evaluated by the first processing element 110 (FIG. 3/S008). Specifically, as illustrated respectively in FIG. 4(b) and FIG. 5(b), a height $h_L$ from the bottom line of the image to the highest edge point in the left side of the image and the number of the edge points $n_L$ are recognized, and a height $h_R$ from the bottom line of the image to the highest edge point in the right side of the image and the number of the edge points $n_R$ are recognized. The height $h_L$ and $h_R$ of the highest edge point are equivalent to a recognizable distance of the lane mark by the vehicle travel support device 10 from the vehicle 1 in the real space. The density $(n_L/h_L)$ of the edge points at the left side of the image and the density $(n_R/h_R)$ of the edge points at the right side thereof are equivalent to the density of the lane mark at the left front side and the density of the lane mark at the right front side of the vehicle 1 in the real space, respectively. The reliability p of the lane mark is evaluated higher stepwise or continuously as at least a part of the highest edge point heights $h_L$ and $h_R$ and the edge point densities $(n_L/h_L)$ and $(n_R/h_R)$ become higher. For example, an average value, a maximum value or a minimum value of the highest edge point heights $h_L$ and $h_R$ (hereinafter referred to as the average value or the like), or an increasing function of the average value or the like may be evaluated as the reliability p of the lane mark. In addition, an average value or the like of the edge point densities $(n_L/h_L)$ and $(n_R/h_R)$ or an increasing function of the average or the like may also be evaluated as the reliability p of the lane mark. It is acceptable to evaluate the reliability p lower stepwise or continuously as a difference between the recognizable distances or the densities of the lane mark in the left front side and the right front side of the vehicle 1 become greater.

Thereafter, whether or not the reliability p evaluated by the first processing element 110 is included in a first reliability range $[p_{1-}, p_{1+}]$ is determined by the second processing element 120 (FIG. 3/S010). It is acceptable to set a maximum reliability $p_{max}$ defined by the self height of the image or the like as the upper limit $p_{1+}$ of the first reliability range. If it is determined that the reliability p is not included in the first reliability range (FIG. 3/S010 . . . NO), whether or not the reliability p is included in a second reliability range $[p_{2-}, p_{2+}(\leq p_{1-})]$ is determined by the second processing element 120 (FIG. 3/S012). The second reliability range contains reliability values lower than the first reliability range.

If it is determined that the reliability p is included in the first reliability range (FIG. 3/S010 . . . YES), the degree of control is set relatively high and a first vehicle travel support control is performed (FIG. 3/S014). Specifically, a gain coefficient of operation control for one or both of the steering device 14 and the braking device 16 (accurately speaking, the actuator included in the steering device 14 and the like) is set relatively great. Furthermore, the number of control variables is set relatively more. For example, the number of control variables for the first vehicle travel support control is set at "2", and the position of the vehicle 1 in the lateral direction and the angle in the travelling direction serving as the two control variables are controlled. An interval from the position of the vehicle 1 to an intersection point between the y axis of the vehicular coordinate system and a reference route (denoted by a chain line) is defined as a position deviation δy of the vehicle 1 from the reference route in the lateral direction. An angle formed between a tangential line to the reference route at the closed point to the position of the vehicle 1 and the x axis is defined as an angle deviation δθ of the vehicle 1 from the angle of the reference route in the travelling direction.

Figure 6:
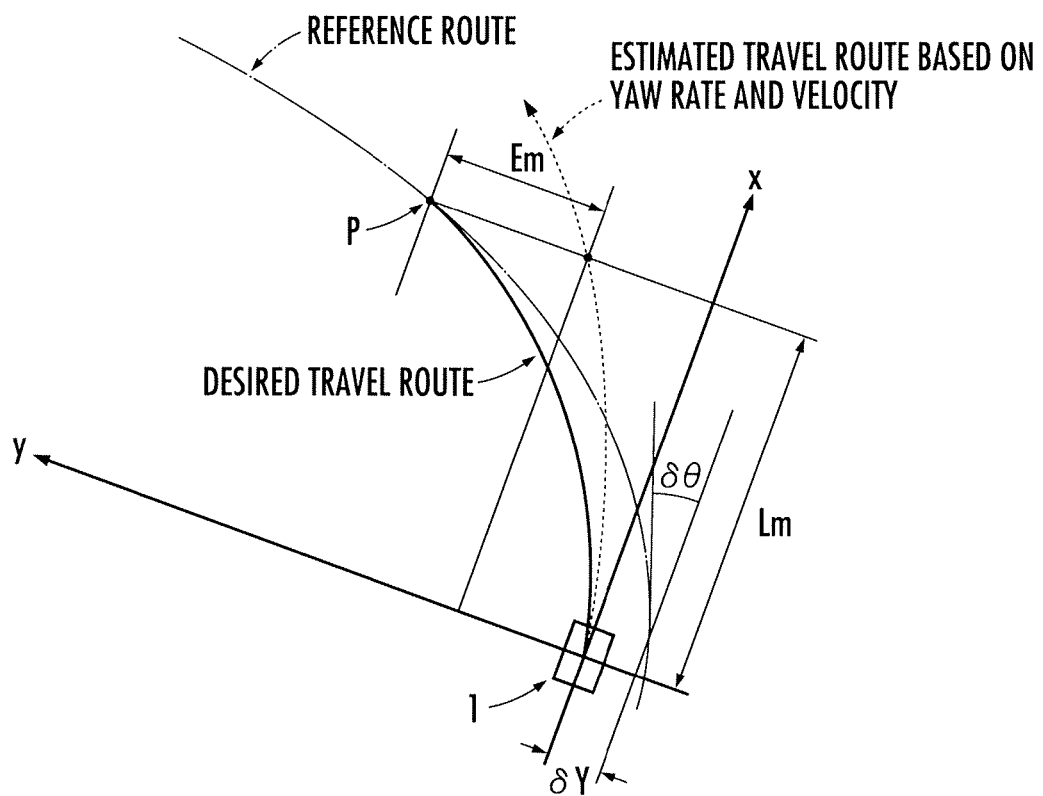
FIG. 6 is an explanatory diagram related to the control on the vehicle travel support.

In the vehicle travel support control, the vehicular velocity v of the vehicle 1 is calculated according to the output signals from the vehicular velocity sensor 122, then, a distance of point of attention Lm is calculated by multiplying the vehicular velocity v by a predefined temporal constant τ. As illustrated in FIG. 6, a desired position p is set at a position on the reference route with the distance of point of attention Lm away from the vehicle 1 in the front direction (+x direction). For example, a central line in the travel area recognized by the first processing element 110 or a line offset scarcely from the central line in the lateral direction is defined as the reference route. As illustrated in FIG. 6 by a solid line, a route varying at a constant curvature from the present position to the desired position p of the vehicle 1 is set as a desired travel route. Additionally, a yaw rate of the vehicle 1 is calculated according to the output signals from the yaw rate sensor 126, and an estimated travel route illustrated in FIG. 6 by a dashed line is recognized on the basis of the vehicular velocity v and the calculated yaw rate. A deviation Em of the estimated travel route from the desired travel route at the position with the distance of point of attention Lm away from the vehicle in the front is calculated. Thereafter, on the basis of the vehicular velocity v, the distance of point of attention Lm and the deviation Em, a lateral acceleration correction amount Gcmp is calculated according to the expression (1).

$$Gcmp = 2Em \cdot v^2/(Lm^2 + Em^2) \tag{1}$$

Thus, the operations of the steering device 14 and the like are controlled to generate the lateral acceleration correction amount Gcmp in the vehicle 1. Accordingly, the behavior of the vehicle 1 is controlled to travel along the desired travel route (refer to the solid line in FIG. 6) other than the estimated travel route (refer to the dashed line in FIG. 6). As mentioned above, when the lateral position of the vehicle 1 is departed from the position of the reference route in the lateral direction or the angle in the travelling direction of the vehicle 1 is departed from the angle of the reference route in the travelling direction, the operations of the steering device 14 and the like are relatively strongly or actively controlled by setting the gain coefficient relatively great. Thereby, a relatively strong assist torque is generated in the vehicle 1 to cancel the lateral position deviation δy and the angle deviation δθ in the early stage, and consequently the travel of the vehicle 1 is supported to prevent the vehicle 1 from departing from the travel area. It is acceptable to set the number of control variables for the first vehicle travel support control at "3" to control the lateral position in the lateral direction, the angle in the travelling direction and the angular velocity of the vehicle 1 in the travelling direction.

If it is determined that the reliability p is included in the second reliability range (FIG. 3/S012 . . . YES), the degree of control is set relatively low and a second vehicle travel support control is performed (FIG. 3/S016). Specifically, the gain coefficient of operation control for one or both of the steering device 14 and the braking device 16 is set relatively small. Furthermore, the number of control variables is set relatively few. For example, the number of control variables for the second vehicle travel support control is set at "1", and the lateral position of the vehicle 1 serving as the one control variable is controlled.

As mentioned above, when the lateral position of the vehicle 1 is departed from the position of the reference route defined in the travel area, the operations of the steering device 14 and the like are relatively weakly or passively controlled by setting the gain coefficient relatively small. Thereby, a relatively weak assist torque is generated in the vehicle 1 to cancel the lateral position deviation δy moderately, and consequently the travel of the vehicle 1 is supported to prevent the vehicle 1 from departing from the travel area. It is acceptable to set the number of control variables for the second vehicle travel support control at "2" to control the lateral position in the lateral direction and the angle in the travelling direction of the vehicle 1 in the travelling direction. However, if it is determined that the angle p of a lane mark is also not included in the second angle range (FIG. 3/S012 . . . NO), the travel support control is omitted.

According to the vehicle 1 and the vehicle travel support device 10 with the aforementioned configurations, the higher the reliability p of a lane mark is, the higher the degree of control on the operation of either one or both of the steering device 14 and the braking device 16 will be set (refer to FIG. 3/S010 . . . YES and S014). Accordingly, when the reliability of a travel area demarcated by the lane mark is higher, the travel of the vehicle 1 is relatively strongly or actively supported to prevent the vehicle 1 from departing from the travel area. On the other hand, the lower the reliability p of the lane mark is, the lower the degree of control on the operations of the steering device 14 and the like will be set (refer to FIG. 3/S010 . . . NO, S012 . . . YES and S016). Accordingly, when the reliability of a travel area demarcated by the lane mark is lower, the travel of the vehicle 1 is relatively weakly or passively supported to prevent the vehicle 1 from departing from the travel area. In other words, when the reliability of the lane mark and the reliability of the travel area are low, the operation of the vehicle travel support device is prevented from being stopped. Even when the reliability of the lane mark and the reliability of the travel area are low, the travel of the vehicle 1 is supported relatively weakly without interruption. Accordingly, the operations of the steering device 14 and the like can be controlled appropriately to prevent the vehicle 1 from departing from the travel area from the viewpoint of supporting the travel of the vehicle.

In the aforementioned embodiment, the degree of control on the steering device 14 and the like is adjusted stepwise through two steps according to the reliability p of a lane mark (refer to FIGS. 3/S010, S012, S014 and S016); however, as another embodiment, it is acceptable to adjust the degree of control on the steering device 14 and the like stepwise through three steps according to the reliability p of a lane mark. It is also acceptable to adjust the degree of control on the steering device 14 and the like continuously. Further, it is acceptable to adjust the distance of point of attention Lm or the temporal constant for defining the distance of point of attention Lm in place of the gain coefficient according to the reliability p of a lane mark (refer to FIG. 6). Furthermore, it is acceptable to interrupt the first vehicle travel support control if a steering torque denoted by an output from the torque sensor 128 is greater than a first torque threshold when the first vehicle travel support control is being performed, and to interrupt the second vehicle travel support control if the steering torque denoted by the output from the torque sensor 128 is smaller than a first torque threshold but greater than a second torque threshold when the second vehicle travel support control is being performed.

What is claimed is:

1. A vehicle travel support device comprising
 a first processing element configured to recognize a disposition of a lane mark on a road where a vehicle is traveling according to an image of the road obtained through an imaging device mounted on the vehicle, said first processing element further configured to recognize a travel area demarcated by the lane mark; and
 a second processing element configured to control an operation of one or both of a steering device and a braking device mounted in the vehicle to prevent the vehicle from departing from the travel area recognized by the first processing element,
 wherein
 the first processing element evaluates a reliability of the lane mark based on a difference between recognizable distances between a first lane mark on the left side of the vehicle and a second lane mark on the right side of the vehicle, or based on a difference between respective densities of the first lane mark on the left side of the vehicle and the second lane mark on the right side of the vehicle, and
 the second processing element sets a degree of control on the operation of either one or both of the steering device and the braking device higher stepwise or continuously as the reliability of the lane mark evaluated by the first processing element becomes higher.

2. The vehicle travel support device according to claim 1, wherein the second processing element sets either one or both functions of a gain coefficient and the number of controlled variables as the degree of control on either one or both of the steering device and the braking device according to the reliability of the lane mark evaluated by the first processing element.

3. A vehicle provided with an imaging device, a steering device, a braking device and the vehicle travel support device according to claim 1.

4. A vehicle travel support program stored on a non-transitory computer-readable storage medium, said travel support program operable to cause a vehicular computer to function as the vehicle travel support device according to claim 1.

5. The vehicle travel support device according to claim 1, wherein the second processing element determines if the reliability is included within a first reliability range or a second reliability range.

6. The vehicle travel support device according to claim 5, wherein the second processing element sets a gain coefficient higher and uses a greater number of control variables if the reliability is found to be within the first reliability range, and the second processing element sets the gain coefficient lower and uses a smaller number of control variables if it is found that the reliability is within the second reliability range.

7. The vehicle travel support device according to claim 1, wherein the difference between recognizable distances between the first and second lane marks is determined by comparing a height of a highest edge point of an image of the first lane mark in said image of the road to a height of a highest edge point of an image of the second lane mark in said image of the road.

* * * * *